United States Patent
Chen

(10) Patent No.: US 6,561,647 B1
(45) Date of Patent: May 13, 2003

(54) ONE-PIECE LENS AND FRAME ASSEMBLY

(75) Inventor: Chih-Lung Chen, Tainan (TW)

(73) Assignee: High Rainbow Ent. Co., Ltd., Tainan (TW)

( * ) Notice: Subject to any disclaimer, the term of this patent is extended or adjusted under 35 U.S.C. 154(b) by 0 days.

(21) Appl. No.: 10/131,399

(22) Filed: Apr. 25, 2002

(51) Int. Cl.⁷ .................................................. G02C 1/04
(52) U.S. Cl. ....................... 351/103; 351/106; 351/140; 351/124
(58) Field of Search ................................. 351/103, 104, 351/105, 106, 107, 108, 109, 140, 141, 124

(56) References Cited

U.S. PATENT DOCUMENTS 5,975,692 A * 11/1999 Pedron ........................ 351/140
6,280,030 B1 * 8/2001 Chen ............................ 351/86
6,367,927 B2 * 4/2002 Yang ........................... 351/103
6,386,704 B1 * 5/2002 Wu ............................. 351/106

* cited by examiner

Primary Examiner—Huy Mai
(74) Attorney, Agent, or Firm—Rosenberg, Klein & Lee

(57) ABSTRACT

A one-piece lens and frame assembly includes a spectacle frame, a one-piece lens and a catching member. The frame is provided with a top hollow and a bottom hollow in the bridge, and a flanged block is provided in each hollow. The one-piece lens has a nose-pad cutout portion in the bottom, and the top and bottom edges of the lens bridge are respectively provided with a notch. Each end of the catching member is bent inward to be a hook portion, each hook portion is provided with a through hole, and an interior room is formed between both hook portions. After the lens bridge being attached to the frame bridge, both hook portions are successively inlaid in both hollows of the frame bridge so as for both flanged blocks to be firmly caught in the through holes.

1 Claim, 5 Drawing Sheets

ONE-PIECE LENS AND FRAME ASSEMBLY

BACKGROUND OF THE INVENTION

1. Field of the Invention

This invention relates to a one-piece lens and frame assembly with innovatory convenience and comfort features, and more particularly to a one-piece lens and frame assembly that can be easily and promptly assembled and secure the best spherical condition of the one-piece lens.

2. Description of the Related Art

There are more and more people who have poor eyesight and must wear eyeglasses to obtain better eyesight. Besides, most people like to do outdoor activities, and they must wear sunglasses to prevent strong sunrays from hurting their eyes. Many people whose eyes may be hurt by strong rays while working must wear industrial safety glasses to protect their eyes. Therefore, various kinds of glasses are indispensable for modern people in daily life.

A common conventional eyeglasses 40, as shown in FIG. 1, is composed by a spectacle frame 41 and a pair of lenses 42. The frame 41 of the eyeglasses 40 is easily squeezed to transform by external force, and the spherical focal distances of both lenses 42 will become improper because the angles of both lenses 42 do not accord with each other. Therefore, a wearer's eyesight will be influenced and the wearer will not feel comfortable while wearing the transformed eyeglasses 40.

Referring to FIG. 2, another kind of conventional glasses includes a one-piece lens 51 and a spectacle frame 52. The lens 51 is assembled with the frame 52 by screws. It is more convenient than the eyeglasses 40 when being assembled, but it still wastes time and cost to be assembled by screws. Besides, the spherical angle of the lens 51 will be influenced because of non-balanced external force or loose screws.

SUMMARY OF THE INVENTION

Therefore, the present invention is to provide a one-piece lens and frame assembly that can substantially obviate the drawbacks of the related conventional arts.

An objective of the present invention is to provide a one-piece lens and frame assembly that can be easily and promptly assembled.

Another objective of the present invention is to provide a one-piece lens and frame assembly that can secure the best spherical condition of the one-piece lens.

Yet another objective of the present invention is to provide a one-piece lens and frame assembly that can save cost and time for assembly.

Accordingly, a one-piece lens and frame assembly in the present invention includes a spectacle frame, a one-piece lens and a catching member. The frame is provided with a top hollow and a bottom hollow in the bridge, and a flanged block is provided in each hollow. The one-piece lens has a nose-pad cutout portion in the bottom, and the top and bottom edges of the lens bridge are respectively provided with a notch. Each end of the catching member is bent inward to be a hook portion, each hook portion is provided with a through hole, and an interior room is formed between both hook portions. After the lens bridge being attached to the frame bridge, both hook portions are successively inlaid in both hollows of the frame bridge so as for both flanged blocks to be firmly caught in the through holes.

BRIEF DESCRIPTION OF THE DRAWINGS

Other features and advantages of the present invention will become apparent in the following detailed description of the preferred embodiments with reference to the accompanying drawings, in which

FIG. 4-1 is an enlarged cross sectional view taken from the circle in FIG. 4; and, FIG. 5 is a perspective view of an embodiment of the one-piece lens and frame assembly in an assembled configuration in accordance with the present invention.

DETAILED DESCRIPTION OF THE PREFERRED EMBODIMENTS

Figure 3:
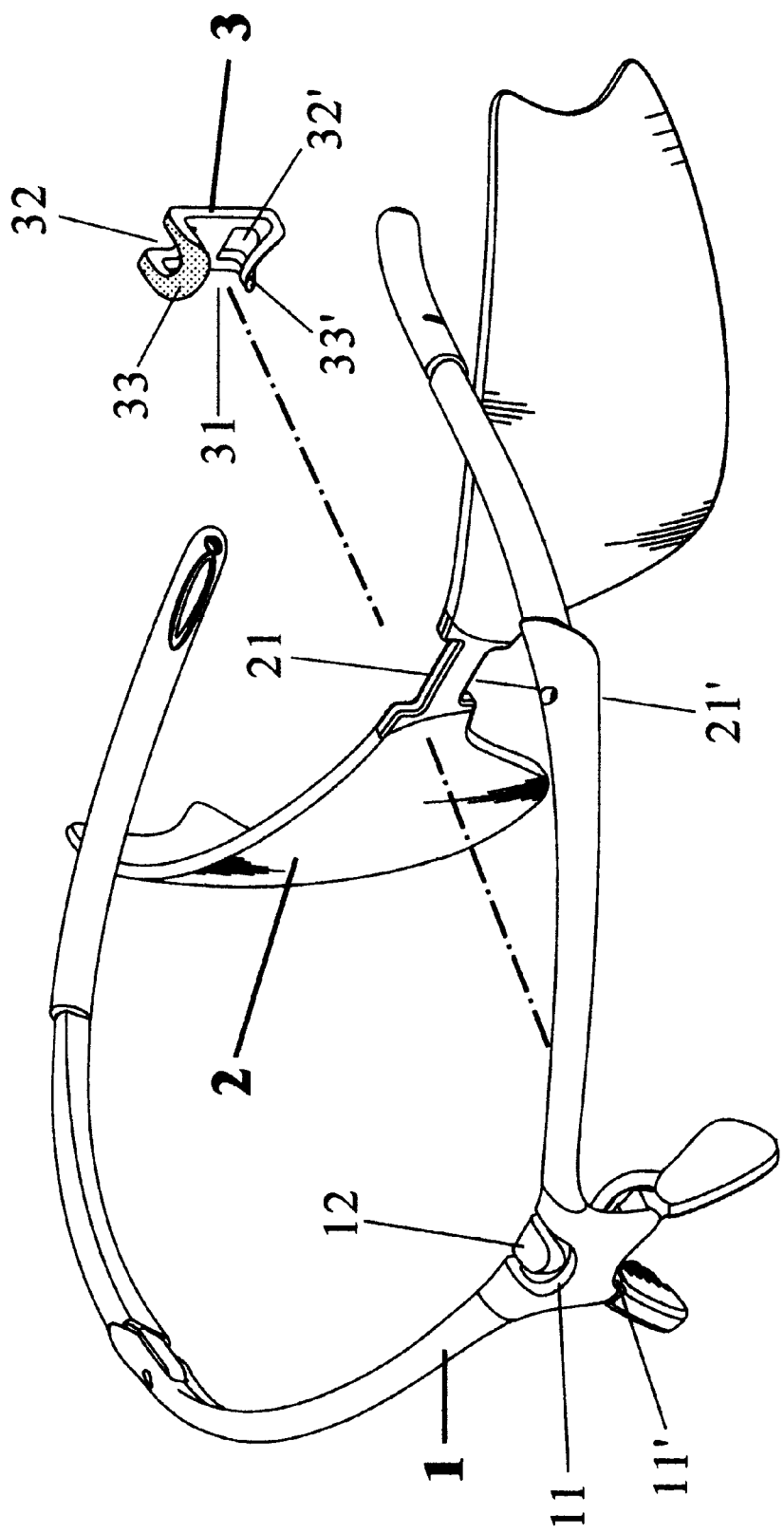
FIG. 3 is an exploded perspective view of an embodiment of the one-piece lens and frame assembly in accordance with the present invention.

Referring to FIG. 3, a one-piece lens and frame assembly in the present invention includes a spectacle frame 1, a one-piece lens 2 and a catching member 3. The frame 1 is provided with a top hollow 11 and a bottom hollow 11' in the bridge. A flanged block 12 is provided in the top hollow 11, and a flanged block 12' is provided in the bottom hollow 11'.

The one-piece lens 2 has a nose-pad cutout portion in the bottom. The top edge of the lens bridge is provided with a notch 21, and the bottom edge of the lens bridge is provided with a notch 21'.

Both ends of the catching member 3 are bent inward to be a top hook portion 33 and a bottom hook portion 33'. The top hook portion 33 is provided with a through hole 32, and the bottom hook portion 33' is provided with a through hole 32'. An interior room 31 is formed between the top hook portion 33 and the bottom hook portion 33'.

Figure 1:
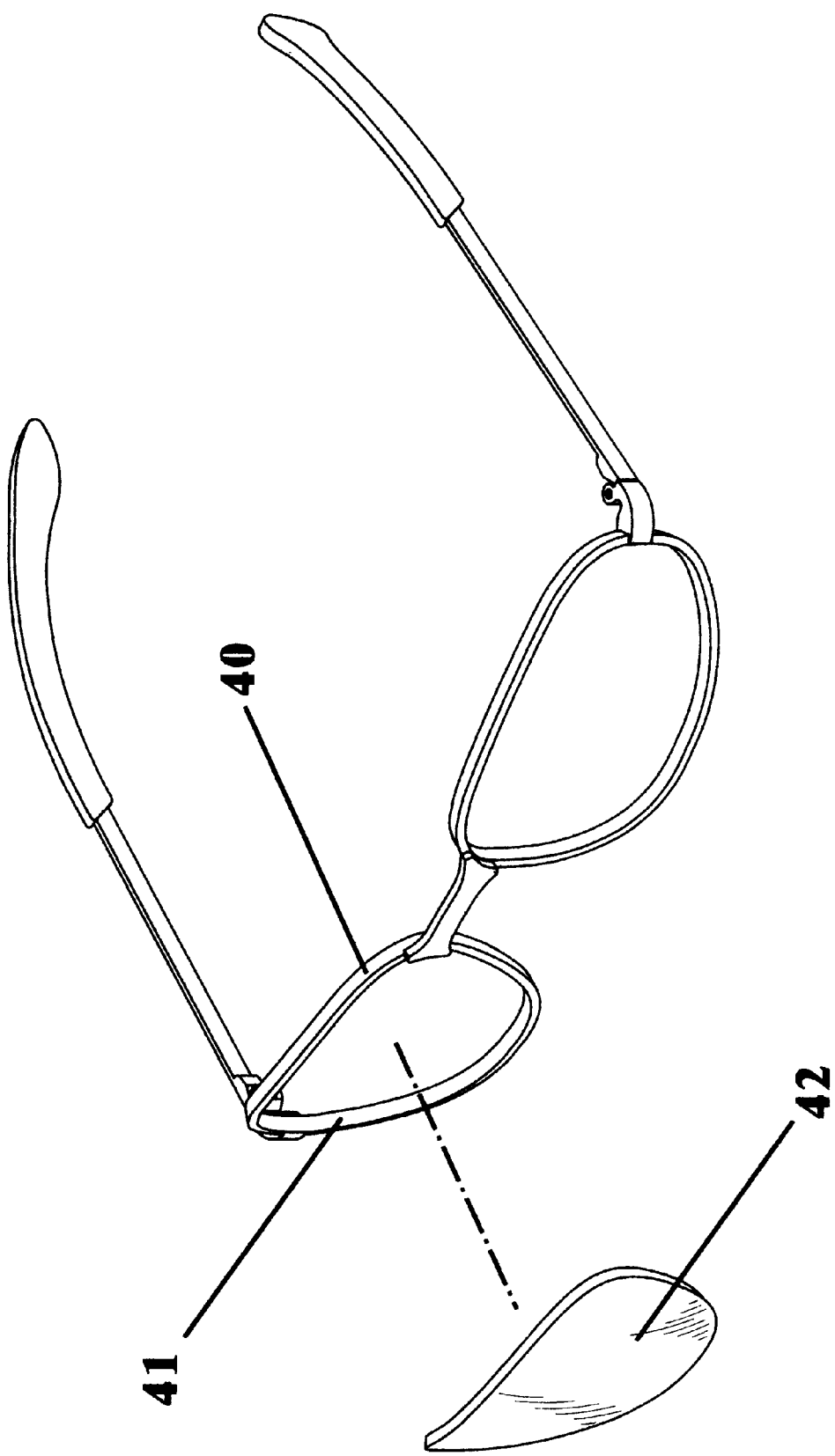
FIG. 1 is an exploded perspective view of a conventional eyeglasses frame and lens.
Figure 2:
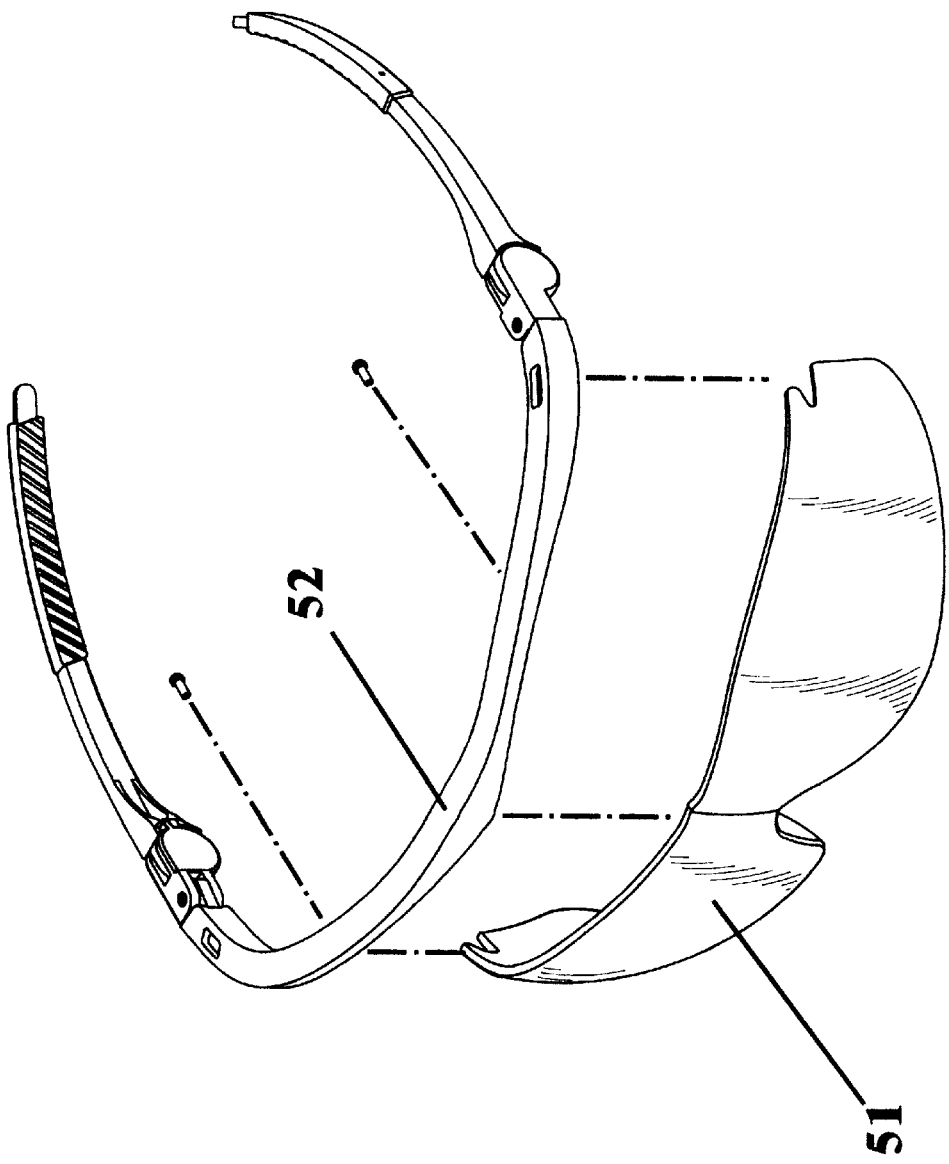
FIG. 2 is an exploded view of a conventional elongated frame and one-piece lens.
Figure 4:
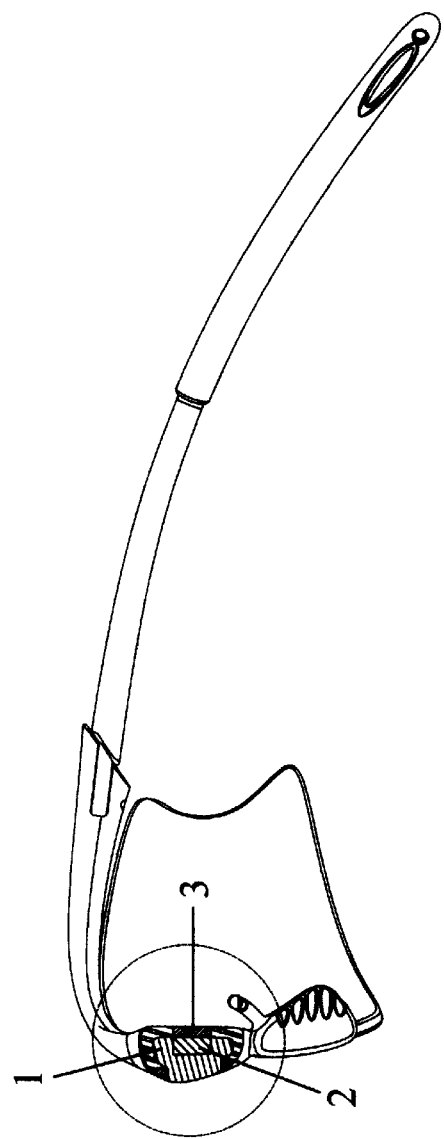
FIG. 4 is a cross sectional view of the one-piece lens and frame assembly in an assembled configuration in accordance with the present invention.
Figures 1, 4:
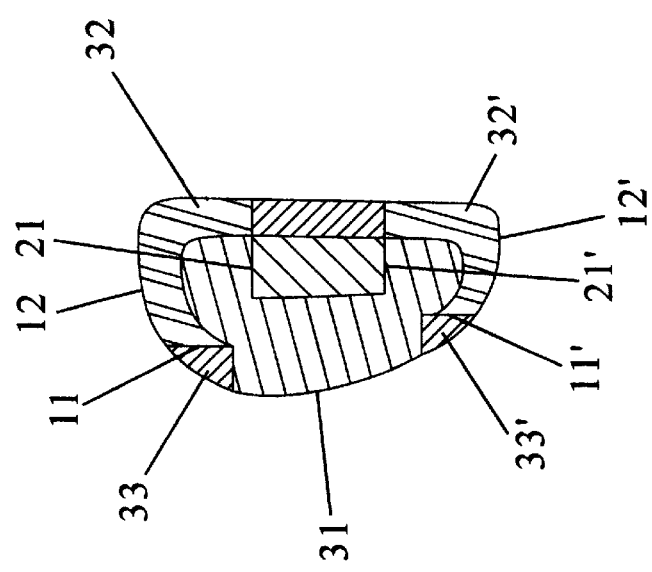
Figure 5:
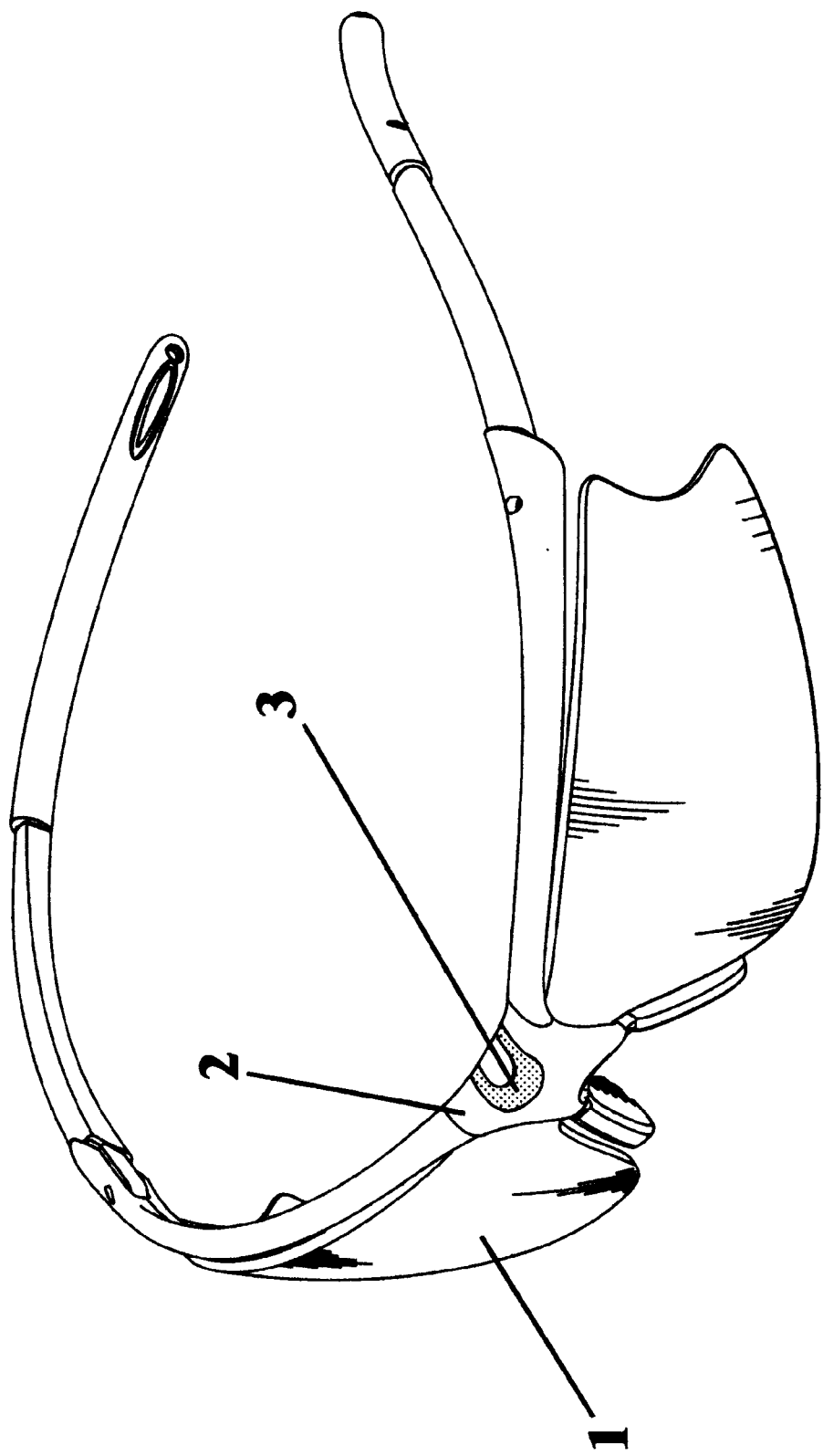

While being assembled, referring to FIGS. 4 and 4-1, after the lens bridge being attached to the inner surface of the frame bridge, both hook portions 33 and 33' of the catching member 3 are successively inlaid in both hollows 11 and 11' of the frame bridge so as for both flanged blocks 12 and 12' to be respectively caught in the through holes 32 and 32' and to firmly secure the one-piece lens 2 to the frame 1.

While the preferred embodiments of the invention have been described above, it will be recognized and understood that various modifications may be made therein, and the appended claims are intended to cover all such modifications which may fall within the spirit and scope of the invention.

What is claimed is:

1. A one-piece lens and frame assembly comprising:

a spectacle frame being provided with a top hollow and a bottom hollow in the bridge, in said top hollow and said bottom hollow being respectively provided with a flanged block;

a one-piece lens having a nose-pad cutout portion in the bottom, the top edge of said lens bridge being provided with a notch, and the bottom edge of said lens bridge being provided with a notch; and, a catching member being provided with both ends to be bent inward to form a top hook portion and a bottom hook portion, said top hook portion being provided with a through hole, said bottom hook portion being provided with a through hole, an interior room being formed between said top hook portion and said bottom hook portion, while being assembled, after said lens bridge being attached to the inner surface of said frame bridge, said both hook portions of said catching member being successively inlaid in said both hollows of said frame bridge so as for said both flanged blocks in said top hollow and said bottom hollow to be respectively caught in said through holes of said catching member and to firmly secure said one-piece lens to said spectacle frame.

* * * * *